(12) United States Patent
Li

(10) Patent No.: US 9,623,585 B2
(45) Date of Patent: Apr. 18, 2017

(54) METHOD FOR PREPARING GRAPHITE FILM

(71) Applicant: JIAXING ZHONGYI CARBON TECHNOLOGY CO., LTD., Jiaxing (CN)

(72) Inventor: Ping Li, Shanghai (CN)

(73) Assignee: JIAXING ZHONGYI CARBON TECHNOLOGY CO., LTD., Jiaxing (CN)

(*) Notice: Subject to any disclaimer, the term of this patent is extended or adjusted under 35 U.S.C. 154(b) by 0 days.

(21) Appl. No.: 15/111,206

(22) PCT Filed: Jan. 22, 2015

(86) PCT No.: PCT/CN2015/071304
§ 371 (c)(1),
(2) Date: Jul. 13, 2016

(87) PCT Pub. No.: WO2015/110034
PCT Pub. Date: Jul. 30, 2015

(65) Prior Publication Data
US 2016/0332327 A1    Nov. 17, 2016

(30) Foreign Application Priority Data

Jan. 27, 2014  (CN) .......................... 2014 1 0040011
Jun. 17, 2014  (CN) .......................... 2014 1 0271160

(51) Int. Cl.
| | | |
|---|---|---|
| B28B 1/40 | (2006.01) | |
| C01B 31/04 | (2006.01) | |
| B32B 7/06 | (2006.01) | |
| B32B 9/00 | (2006.01) | |
| B32B 9/04 | (2006.01) | |
| B32B 27/28 | (2006.01) | |
| B28B 3/12 | (2006.01) | |
| B29C 63/14 | (2006.01) | |
| B65B 13/02 | (2006.01) | |
| B29K 79/00 | (2006.01) | |

(52) U.S. Cl.
CPC ............... *B28B 1/40* (2013.01); *B28B 3/126* (2013.01); *B29C 63/14* (2013.01); *B32B 7/06* (2013.01); *B32B 9/007* (2013.01); *B32B 9/045* (2013.01); *B32B 27/281* (2013.01); *B65B 13/02* (2013.01); *C01B 31/04* (2013.01); *B29K 2079/08* (2013.01); *B32B 2307/306* (2013.01)

(58) Field of Classification Search
CPC .. B32B 3/00; B32B 7/06; B32B 9/007; B28B 1/40
See application file for complete search history.

(56) References Cited

U.S. PATENT DOCUMENTS

| | | | |
|---|---|---|---|
| 9,249,024 B2* | 2/2016 | Ohta | C01B 31/04 |
| 2012/0121880 A1* | 5/2012 | Ohta | C01B 31/04 |
| | | | 428/220 |

FOREIGN PATENT DOCUMENTS

| | | |
|---|---|---|
| CN | 102149663 | 8/2011 |
| CN | 102745674 | 10/2012 |
| CN | 103011141 | 4/2013 |
| CN | 104015468 | 9/2014 |
| JP | 2013-056797 | 3/2013 |

\* cited by examiner

*Primary Examiner* — Sean E Conley
(74) *Attorney, Agent, or Firm* — Lex IP Meister, PLLC

(57) ABSTRACT

Disclosed is a method for preparing graphite film, comprising steps as follows: 1) winding; 2) carbonizing at a low temperature; 3) graphitizing at a high temperature; 4) unwinding and feeding, winding up the electrographite film semi-finished product and flexible graphite paper separately; 5) calendaring to press the electrographite film semi-finished product against release film or protective film; 6) winding up and packaging. The winding process comprises steps as follows: a. winding high temperature resistant elastic material around the graphite cylinder core; b. bonding macromolecular film to flexible graphite paper, and then winding around the graphite cylinder core based on step a; c. when the macromolecular film and flexible graphite paper wound in step b reach the predetermined thickness, securing with carbon cord.

15 Claims, No Drawings

METHOD FOR PREPARING GRAPHITE FILM

FIELD OF THE INVENTION

The present invention relates to a method for fabricating a graphite film which is a heat dissipation film, and a heat dissipater material of an electronic device, a precision device, etc., and particularly to a method for fabricating a smooth strip-shaped graphite film.

BACKGROUND OF THE INVENTION

Along with the constant development of the electronic industry, increasingly improved heat dissipation is required in heat generating components in mobile phones, computers, liquid crystal TV sets, and various integrated circuit boards, so the graphite film which is a highly thermally-conductive and membrane-shaped thermally-conductive material has been widely applied in the electronic industry because it can effectively pass heat generated by an electronic component to a heat dissipater, or another heat radiation body so that the heat of the electronic component is diffused rapidly to thereby lower temperate of the heat-generating electronic component. The graphite film is currently fabricated by sandwiching a single sheet of macromolecule film between pieces of flexible graphite papers, and treating it thermally, but such a graphite film is limited in size, produced inefficiently, and suppressed from being applied later, so it is currently desirable to address how to produce efficiently a continuous roll of graphite film material. The continuous roll of graphite film material needs to be produced by winding a macromolecule film, e.g., a PI film, etc., with secondary flexible macromolecule paper. While this roll of material is being sintered, the macromolecule film may vary in size in the following three aspects: firstly it is contracted in planar size while being carbonized, secondly it is contracted in height while being carbonized, and thirdly it is expanded in height while being graphitized, where the first and second variations in size must occur subject to a pressure constraint; otherwise, the carbonized macromolecule film may be warped freely, so that the quality of the surface thereof after being carbonized may not be satisfactory, and the macromolecule film can not be calendered, or another subsequent process can not be performed thereon; and the third variation in size may cause the secondary flexible graphite paper to be subjected to a significant tensile force due to a rigid constraint, and thus broken, so that the secondary flexible graphite paper can not be reused, thus greatly degrading the productivity, which may make it impossible to produce the roll of graphite film material massively.

SUMMARY OF THE INVENTION

A technical problem to be addressed by the invention is to provide an innovative method for fabricating a graphite film in the following technical solution: a method for fabricating a graphite film includes the steps of: 1) winding; 2) carbonizing at low temperature; 3) graphitizing at high temperature; 4) unwinding the materials and winding a semi-product of the graphite film, and flexible graphite paper respectively; and 5) calendering the semi-product of the graphite film on a release film or a protective film; and 6) winding and packaging, wherein the winding includes the steps of: a. winding a thermostable elastic material on a graphite cylinder core; b. fitting a macromolecule film to the flexible graphite paper, and further winding them on the graphite cylinder core further to the step a; c. fastening the macromolecule film and the flexible graphite paper wound with a preset thickness in the step b using a carbon cord.

The invention is further characterized in that:
in the step b, before the macromolecule film is fit to the flexible graphite paper, firstly the macromolecule film is cut into cut dotted lines in a semi-broken mode at an interval of 0.2 to 5 meters using a dotted knife, and then the macromolecule film with the cut dotted lines is fit to the flexible graphite paper; and they are wound on the graphite cylinder core further to the step a.

In the step c, after the macromolecule film and the flexible graphite paper are wound with the preset thickness in the step b, they are wrapped by a graphite plate, and then fastened using the carbon cord.

In the step c, after the macromolecule film and the flexible graphite paper are wound with the preset thickness in the step b, the thermostable elastic material is further wound with a preset thickness, and then they are wrapped by a graphite plate, and next fastened using the carbon cord.

In the step b, the macromolecule film and the flexible graphite paper being wound are stopped temporally from being wound, and the thermostable elastic material is wound with a preset thickness, and then the macromolecule film and the flexible graphite paper are further wound.

The thermostable elastic material is a carbon felt or a graphite felt or a ceramic fabric felt.

The macromolecule film is a PI film or a PA film or a PBI film.

Advantageous effects of the invention lie in that since the macromolecule film and the flexible graphite paper are finally fastened using the carbon cord in the winding process, some pressure can be applied thereto in the carbonizing process so that the carbonized macromolecule film will not be wrapped freely; and also since the layer of thermostable elastic material is added in the winding process, a flexible constraint can be applied to the flexible graphite paper in the graphitizing process so that the graphite paper will not be subjected to a significant tensile force, and thus broken, but can be reused. Moreover this fabricating method can produce the continuous roll of graphite film with a high quality efficiently and massively.

DETAILED DESCRIPTION OF EMBODIMENTS

The invention will be described below in further details with reference to particular embodiments thereof.

First Embodiment

In this embodiment, a macromolecule film is a PI film, and a thermostable elastic material is a carbon felt.

A method for fabricating a graphite film includes the steps of: 1) winding: a. winding a carbon felt on a graphite cylinder core; b. fitting a PI film to flexible graphite paper, and further winding them on the graphite cylinder core further to the step a; c. fastening the PI film and the flexible graphite paper wound with a preset thickness in the step b using a carbon cord; 2) carbonizing at low temperature; 3) graphitizing at high temperature; 4) unwinding the materials, and winding a semi-product of the graphite film, and the flexible graphite paper respectively; and 5) calendering the semi-product of the graphite film on a release film, a protective film, or another protective material; and 6) winding and packaging.

In this embodiment, the tensile force of the carbon cord is adjusted as a function of the diameter of the roll of material, the thickness of the carbon felt, the thickness of the flexible graphite paper, the thickness of the PI film, and other parameters to thereby maintain some pressure all the time while the PI film is being carbonized and sintered so that the carbonized PI film is continuously smooth without being warped or subjected to other defects; and moreover the carbon felt can provide the PI film being graphitized with some expansion space so that the flexible graphite paper will not be broken but can be reused to thereby greatly improve the efficiency of producing the graphite film.

In the invention, the amount by which the thickness of the thermostable elastic material is initially compressed is calculated as a function of the number of turns by which the PI film is wound, the original thickness of a single layer of PI film, and the thickness of a single layer of carbonized PI film, and the tensile force of the carbon cord is adjusted according to this amount. The amount by which the thickness of the thermostable elastic material is initially compressed is equal to the product of the number of turns by which the PI film is wound, and the thickness of a single layer of PI film minus the thickness of a single layer of carbonized PI film, for example, if the number of turns by which the PI film is wound is 2000 turns, the thickness of a single layer of PI film is 50 micrometers, and the thickness of a single layer of carbonized PI film is 35 micrometers, then the amount by which the thickness of the thermostable elastic material is initially compressed will be 30 millimeters.

In the invention, the largest amount by which the thickness of the thermostable elastic material is compressed is calculated as a function of the number of turns by which the PI film is wound, the thickness of a single layer of graphitized PI film, and the thickness of a single layer of carbonized PI film. The largest amount by which the thickness of the thermostable elastic material is compressed is equal to the product of the number of turns by which the PI film is wound, and the thickness of a single layer of graphitized PI film minus the thickness of a single layer of carbonized PI film, for example, if the number of turns by which the PI film is wound is 2000 turns, the thickness of a single layer of graphitized PI film is 65 micrometers, and the thickness of a single layer of carbonized PI film is 35 micrometers, then the largest amount by which the thickness of the thermostable elastic material is compressed will be 60 millimeters.

In the invention, the number of turns by which the carbon felt is wound is calculated as function of the largest amount by which the thickness of the thermostable elastic material is compressed, and the largest amount by which the thickness of a single layer of carbon felt can be compressed. The number of turns by which the carbon felt is wound is equal to the largest amount by which the thickness of the thermostable elastic material is compressed, divided by the largest amount by which the thickness of a single layer of carbon felt can be compressed, for example, if the largest amount by which the thickness of the thermostable elastic material is compressed is 60 mm, and the largest amount by which the thickness of a single layer of carbon felt can be compressed is 6 mm, then the number of turns by which the carbon felt is wound will be 60 mm/6 mm=10, that is, the carbon felt shall be wound by 10 turns.

If the diameter of a crucible is 500 mm, the thermostable elastic material is the carbon felt, the thickness of a single layer of carbon felt is 8 mm, the largest amount by which the thickness of a single layer of carbon felt can be compressed is 7 mm, the diameter of the graphite cylinder core is 70 mm, the initial thickness of the PI film is 50 micrometers, the thickness of the carbonized PI film is 38 micrometers, the thickness of the graphitized PI film is 65 micrometers, the thickness of the flexible graphite paper is 0.1 mm, the number of turns by which the PI film is wound is 1250 turns, the large amount by which the thickness of the PI film is compressed is (65−38) micrometers*1250/1000=33.75 mm, the number of turns by which the PI film is wound is 33.75/7=5 turns, and the thickness of the carbon felt is initially compressed by (0.05−0.038)*1250=15 mm, that is, the amount of each turn of carbon felt is compressed by 3 mm, then the largest outer diameter of the entire roll of material will be 1250*(0.1+0.05) mm*2+70 mm+5*(8−3) mm*2=495 mm.

Since the PI film and the flexible graphite paper are finally fastened using the carbon cord in the winding process, some pressure can be applied thereto in the carbonizing process so that the carbonized PI film will not be warped freely; and also since the layer of carbon felt is added in the winding process, a flexible constraint can be applied to the flexible graphite paper in the graphitizing process so that the graphite paper will not be subjected to a significant tensile force, and thus broken, but can be reused. Moreover this fabricating method can produce the continuous roll of graphite film with a high quality efficiently and massively.

Second Embodiment

The other steps are the same as those in the first embodiment except that in the step b, before the macromolecule film is fit to the flexible graphite paper, firstly the macromolecule film is cut into cut dotted lines in a semi-broken mode at an interval of 2 meters using a dotted knife, and then the macromolecule film with the cut dotted lines is fit to the flexible graphite paper; and they are wound on the graphite cylinder core further to the step a. The amount by which the thickness of the carbon felt is initially compressed, and the number of turns by which the carbon felt is wound, are calculated in the same way as in the first embodiment. Since firstly the macromolecule film is cut into uniformly distributed cut dotted lines in a semi-broken mode at an interval of 2 meters using a dotted knife, a stress on the graphite film being subsequently carbonized and graphitized will be released at the cut dotted lines, and the macromolecule film is fully broken at those semi-broken sites, where the broken sections are smooth, clean, and orderly, so that the 2-meter graphite film product is produced directly. In this embodiment, the macromolecule film is cut in a semi-broken mode at an interval of 2 meters, but the graphite film can be produced in actual production by adjusting flexibly the distance between the dotted lines as required, where the dotted lines may or may not be distributed uniformly, to thereby control flexibly the size of the product, for example, the macromolecule film can be cut in a semi-broken mode at an interval of 0.2 meter, 1 meter, 3 meter, 5 meter, or any combination thereof.

Third Embodiment

The other steps are the same as in the first embodiment except in the step c, after the PI film and the flexible graphite paper are wound with the preset thickness in the step b, they are wrapped by a graphite plate, and then fastened using the carbon cord. Since they are wrapped by the graphite plate, and then fastened using the carbon cord, the fastening force of the carbon cord can be applied more uniformly to the internal roll of material. The amount by which the thickness of the carbon felt is initially compressed, and the number of turns by which the carbon felt is wound can be calculated in the same way as in the first embodiment.

Fourth Embodiment

The other steps are the same as in the first embodiment except in the step c, after the PI film and the flexible graphite paper are wound with the preset thickness in the step b, the carbon felt is further wound with a preset thickness, and then they are wrapped by a graphite plate, and next fastened using the carbon cord. Since the carbon felt is wound inside and outside, and finally they are wrapped by the graphite plate, and then fastened using the carbon cord, the fastening force of the carbon cord can be applied more uniformly to the internal roll of material. The amount by which the thickness of the carbon felt is initially compressed, and the number of turns by which the carbon felt is wound can be calculated in the same way as in the first embodiment.

Fifth Embodiment

The other steps are the same as in the first embodiment except in the step b, the PI film and the flexible graphite paper being wound are stopped temporally from being wound, and the carbon felt is wound with a preset thickness, and then the PI film and the flexible graphite paper being wound are further wound. The amount by which the thickness of the carbon felt is initially compressed, and the number of turns by which the carbon felt is wound can be calculated in the same way as in the first embodiment.

In the invention, carbonization at low temperature is a process of preheating the macromolecule film to approximately at least 800° C., and a process of heating and decomposing the macromolecule film into the carbonized film. Graphitization at high temperature is a process of heating the carbonized film or the macromolecule film fabricated in the carbonization process at a temperature higher than 1800° C. to fabricate the original material of the graphite film.

The invention has been described above merely by way of an example, for example, the macromolecule film is a PI film, i.e., a polyimide film, but the macromolecule film can alternatively be a PA film, i.e., a polyamide film, a PBI film, i.e., apolybenzimidazole film, a PBBI film, i.e., a polybenzobisimidazole film, a PPV film, i.e., a poly (p-phenylene vinylene) film, etc., in a real application; likewise, although in the embodiments above, the thermostable elastic material is a carbon felt, it can alternatively be a graphite felt, a ceramic fabric felt, etc. Moreover, the thermostable elastic material may not be wound as described above, but may be wound otherwise, for example, firstly a segment thereof can be wound on the graphic cylinder core, then the macromolecule film and the flexible graphite paper can be wound, then a segment of the thermostable elastic material may be wound, then the macromolecule film and the flexible graphite paper can be wound, then a segment of the thermostable elastic material may be wound, and finally they may be fastened using the carbon cord, or the graphite plate and the carbon cord to thereby apply a uniform pressure to the macromolecule film so as to produce the graphite film with a high quality. Thus the scope of the invention will not be limited to the embodiments above, and on contrary, the invention is intended to cover all the technical solutions literally or equivalently and essentially falling into the scope of the appended claims. The scope of the invention is as defined in the appended claims.

The invention claimed is:

1. A method for fabricating a graphite film, the method comprising the steps of:
1) winding materials; 2) carbonizing the materials at low temperature; 3) graphitizing the materials at high temperature; 4) unwinding the materials and winding a semi-product of the graphite film, and flexible graphite paper respectively; and 5) calendering the semi-product of the graphite film on a release film or a protective film; and 6) winding and packaging, wherein the winding of step 1) comprises the steps of: a. winding a thermostable elastic material on a graphite cylinder core; b. fitting a macromolecule film to the flexible graphite paper, and further winding them on the graphite cylinder core further to the step a; c. fastening the macromolecule film and the flexible graphite paper wound with a preset thickness in the step b using a carbon cord.

2. The method for fabricating a graphite film according to claim 1, wherein in the step b, before the macromolecule film is fit to the flexible graphite paper, firstly the macromolecule film is cut into cut dotted lines in a semi-broken mode at an interval of 0.2 to 5 meters using a dotted knife, and then the macromolecule film with the cut dotted lines is fit to the flexible graphite paper; and they are wound on the graphite cylinder core further to the step a.

3. The method for fabricating a graphite film according to claim 1, wherein in the step c, after the macromolecule film and the flexible graphite paper are wound with the preset thickness in the step b, they are wrapped by a graphite plate, and then fastened using the carbon cord.

4. The method for fabricating a graphite film according to claim 1, wherein in the step c, after the macromolecule film and the flexible graphite paper are wound with the preset thickness in the step b, the thermostable elastic material is further wound with a preset thickness, and then they are wrapped by a graphite plate, and next fastened using the carbon cord.

5. The method for fabricating a graphite film according to claim 1, wherein in the step b, the macromolecule film and the flexible graphite paper being wound are stopped temporally from being wound, and the thermostable elastic material is wound with a preset thickness, and then the macromolecule film and the flexible graphite paper are further wound.

6. The method for fabricating a graphite film according to claim 1, wherein the thermostable elastic material is a carbon felt or a graphite felt or a ceramic fabric felt.

7. The method for fabricating a graphite film according to claim 1, wherein the macromolecule film is a PI film or a PA film or a PBI film.

8. The method for fabricating a graphite film according to claim 2, wherein the thermostable elastic material is a carbon felt or a graphite felt or a ceramic fabric felt.

9. The method for fabricating a graphite film according to claim 3, wherein the thermostable elastic material is a carbon felt or a graphite felt or a ceramic fabric felt.

10. The method for fabricating a graphite film according to claim 4, wherein the thermostable elastic material is a carbon felt or a graphite felt or a ceramic fabric felt.

11. The method for fabricating a graphite film according to claim 5, wherein the thermostable elastic material is a carbon felt or a graphite felt or a ceramic fabric felt.

12. The method for fabricating a graphite film according to claim 2, wherein the macromolecule film is a PI film or a PA film or a PBI film.

13. The method for fabricating a graphite film according to claim 3, wherein the macromolecule film is a PI film or a PA film or a PBI film.

14. The method for fabricating a graphite film according to claim 4, wherein the macromolecule film is a PI film or a PA film or a PBI film.

15. The method for fabricating a graphite film according to claim 5, wherein the macromolecule film is a PI film or a PA film or a PBI film.

* * * * *